US010808888B2

(12) United States Patent
Nowak et al.

(10) Patent No.: US 10,808,888 B2
(45) Date of Patent: Oct. 20, 2020

(54) VESSEL AND PIPELINE INSERTION TOOL

(71) Applicant: Sentry Equipment Corp., Oconomowoc, WI (US)

(72) Inventors: David Nowak, St. Francis, WI (US); Nathan Pliska, Watertown, WI (US)

(73) Assignee: Sentry Equipment Corp., Oconomowoc, WI (US)

( * ) Notice: Subject to any disclaimer, the term of this patent is extended or adjusted under 35 U.S.C. 154(b) by 0 days.

(21) Appl. No.: 16/361,872

(22) Filed: Mar. 22, 2019

(65) Prior Publication Data

US 2020/0300414 A1  Sep. 24, 2020

(51) Int. Cl.
  *F17C 13/02* (2006.01)
  *G01N 17/04* (2006.01)
  *F17D 3/12* (2006.01)

(52) U.S. Cl.
  CPC ............... *F17C 13/02* (2013.01); *F17D 3/12* (2013.01); *G01N 17/046* (2013.01)

(58) Field of Classification Search
  CPC .......... F17C 13/02; G01N 17/046; F17D 3/12
  USPC .................. 73/866.5, 290 R, 863.53, 863.81
  See application file for complete search history.

(56) References Cited

U.S. PATENT DOCUMENTS

| 5,138,755 A | * | 8/1992 | Evans | ................. B25B 27/0028 |
| | | | | 29/256 |
| 8,359,937 B2 | * | 1/2013 | Evans | ................. B25B 27/0028 |
| | | | | 29/256 |

* cited by examiner

*Primary Examiner* — Craig M Schneider
*Assistant Examiner* — Jason K Niesz
(74) *Attorney, Agent, or Firm* — Jason Munger; McKinley & Kirby Ltd.

(57) ABSTRACT

An improved insertion tool for placing/removing objects in a pressurized vessel, the object mounted on an elongate object-holder of a tool attached to the pressurized vessel, the insertion tool including (a) one or more elongate guides each having a distal end and a proximal end, (b) a retractor assembly attached to the proximal end of the elongate guides, (c) a top-plate assembly attached to the distal end of the elongate guides, and (d) a travel-plate assembly slidably mounted to the elongate guides and configured to be attached to the elongate object-holder and moved along the elongate guides by the retractor assembly, the improvement comprising: the retractor assembly includes a removable link block configured to be removably attached to a body of the connection tool, the link block configured to thereafter be removably mounted in the retractor assembly with no degrees-of-freedom of movement while mounted in the retractor assembly.

5 Claims, 10 Drawing Sheets

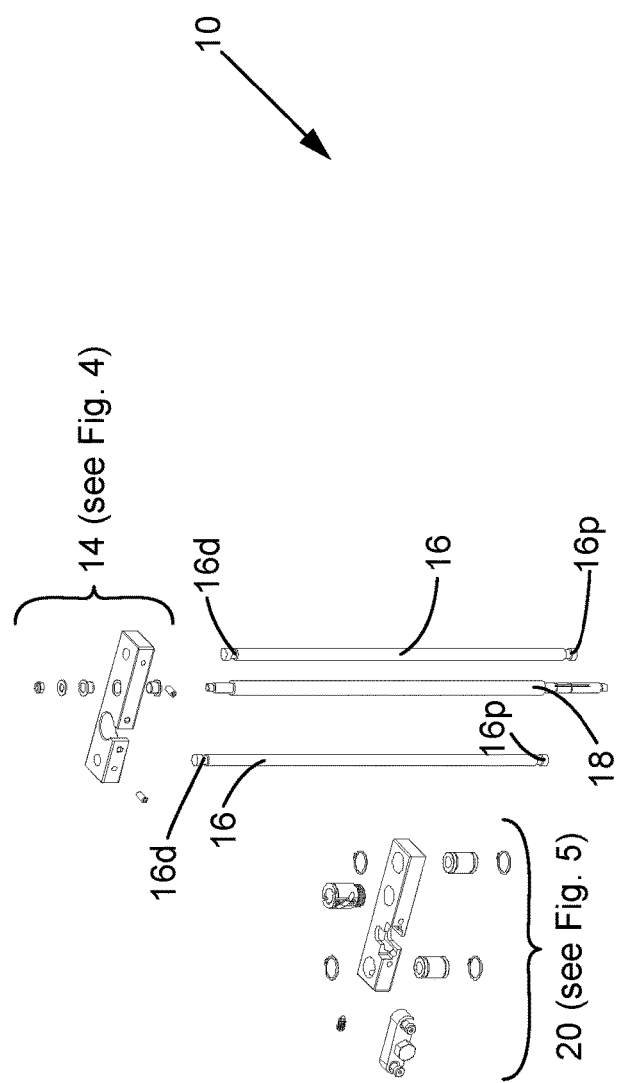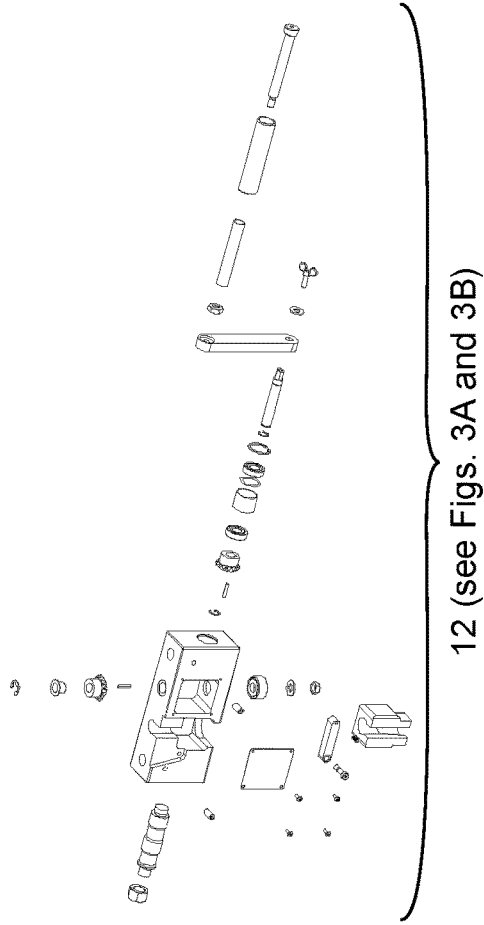
FIG. 2

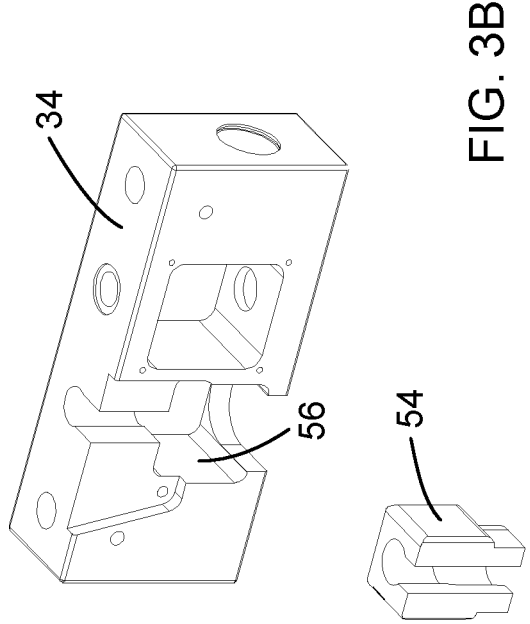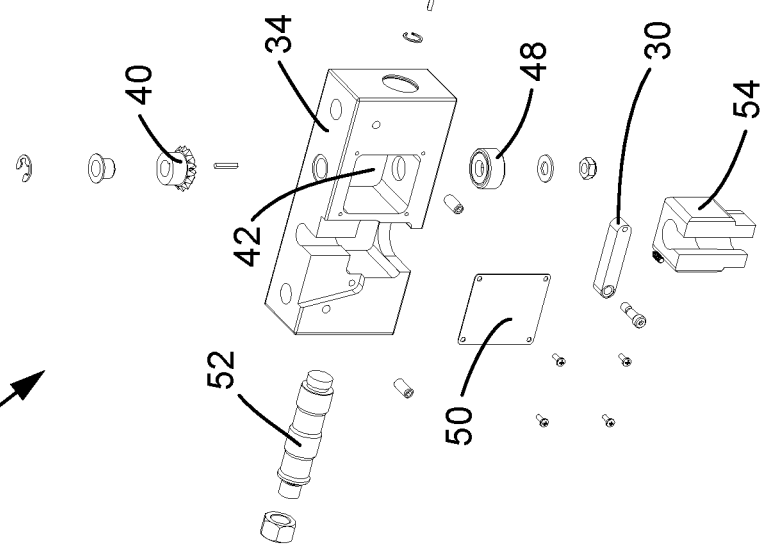

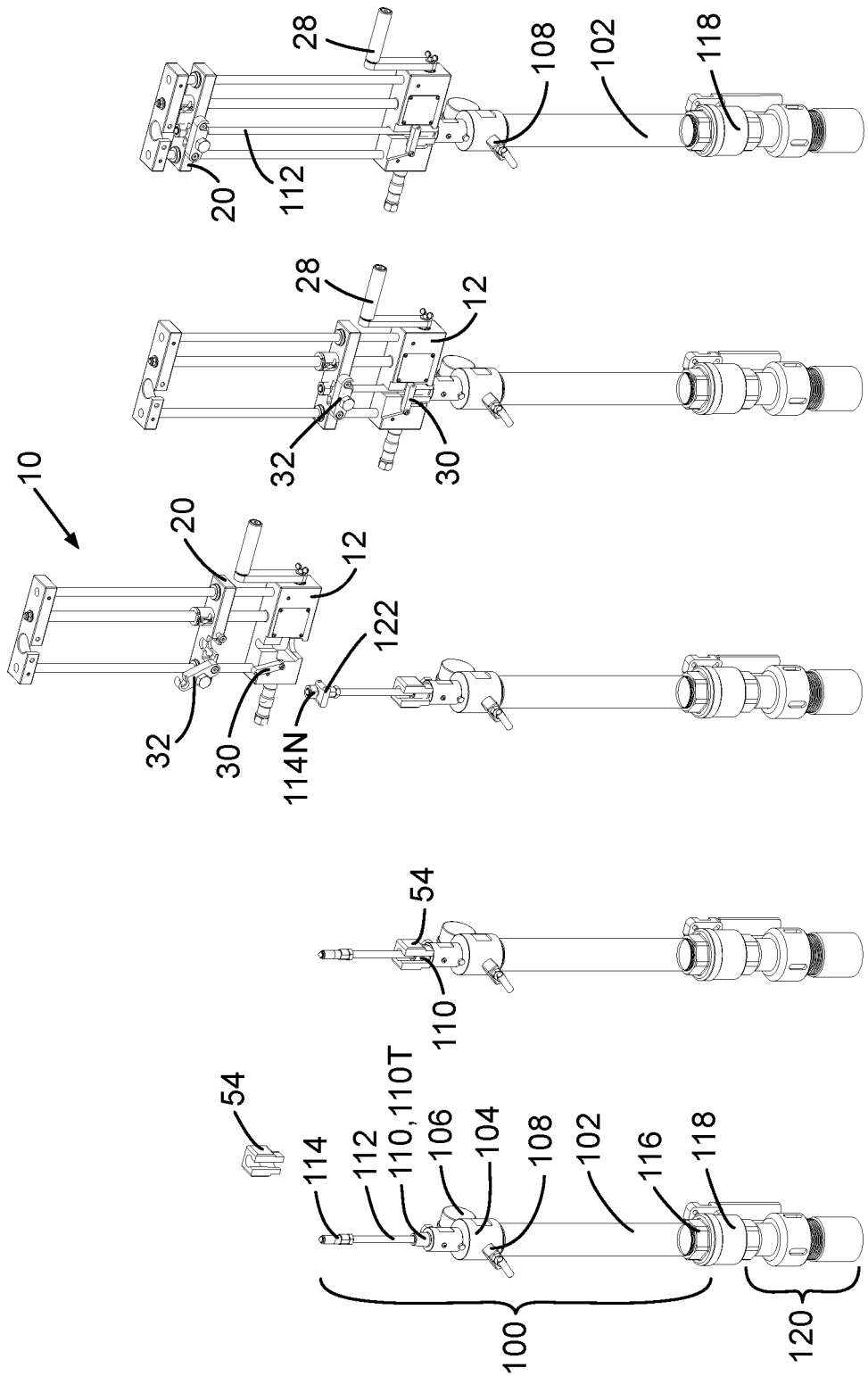

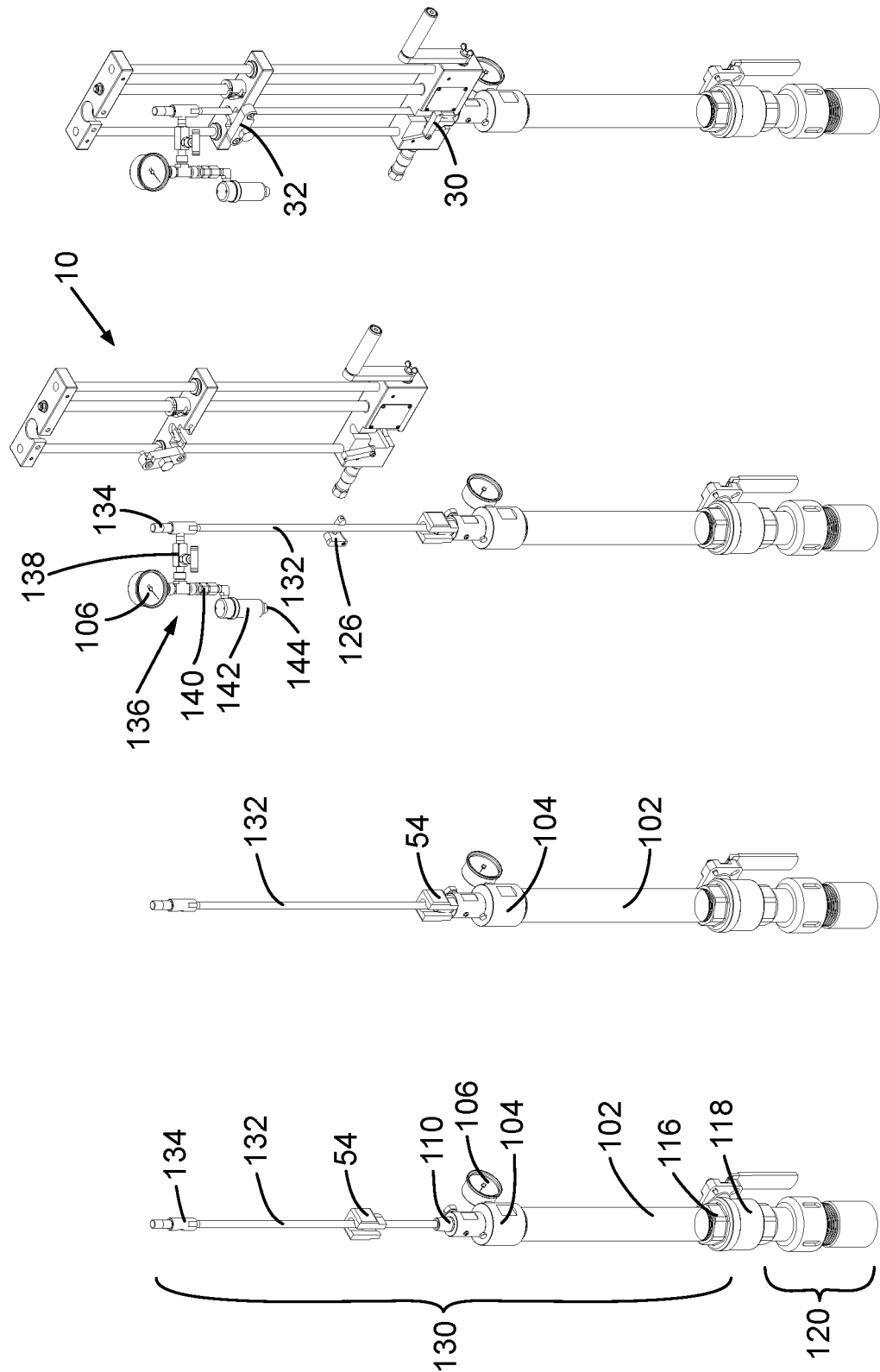

VESSEL AND PIPELINE INSERTION TOOL

FIELD OF THE INVENTION

This invention relates generally to insertion tools and more particularly to tools for insertion and removal access in pipelines and other pressurized vessels.

BACKGROUND OF THE INVENTION

Insertion tools are employed in the chemical processing industry in order to place and retrieve various objects into and from pipelines and other pressurized vessels without interruption of the operation of such systems. These objects may be apparatus such as corrosion coupon holders, injection and sample quills, chemical injection nozzles and atomizers.

U.S. Pat. No. 8,359,937 (Evans et al.), now owned by Sentry Equipment Corporation of Oconomowoc, Wis., describes one insertion tool which addresses some of the issues encountered while attempting to insert or retract objects into and from vessels under high pressure. However, it has been found that such processes may require more than a single operator to perform all of the required tasks, sometimes because of the size and weight of the insertion tool itself or because of the often awkward procedure required to align components during the operation. Furthermore, operations are made even more difficult when environmental conditions are severe or when such vessels are located in awkward-to-reach places.

The present invention addresses many of these issues, making such operations much easier to perform and often enabling them to be carried out by a single operator.

OBJECTS OF THE INVENTION

It is an object of the inventive insertion tool disclosed herein to provide a tool which is more easily attached to apparatus at points in pressurized vessels at which insertion and retrieval of objects from such vessels is required.

Another object of the present invention is to speed the process of insertion and removal of objects into and from pressurized vessels.

Another object is to provide an insertion tool which can easily be operated by only one human operator.

These and other objects of the invention will be apparent from the following descriptions and from the drawings.

SUMMARY OF THE INVENTION

The term "pressurized vessel" as used herein includes pipelines, fluid conduits, storage tanks, chemical reactors and the like. In addition, the term "pressurized vessel" does not mean that the vessel is necessarily pressurized during all instances of use of the inventive insertion tool although a pressurized condition is typically the case, such as in high-pressure pipelines.

The present invention is an improved insertion tool for placing and removing an object in and out of a pressurized vessel. The object is mounted on a vessel-end of an elongate object-holder of a connection tool that is attached to the pressurized vessel and in which the elongate object-holder is slidably and sealably mounted. The insertion tool includes (a) one or more elongate guides each having a distal end and a proximal end, (b) a retractor assembly attached to the proximal end of the elongate guides, (c) a top-plate assembly attached to the distal end of the elongate guides, and (d) a travel-plate assembly slidably mounted to the elongate guides and configured to be attached to the elongate object-holder and moved along the elongate guides by the retractor assembly. The improvement comprises (1) the retractor assembly having a removable link block which is configured to be removably attached to a body of the connection tool, and (2) the link block is configured to thereafter be removably mounted in the retractor assembly with no degrees-of-freedom of movement while mounted in the retractor assembly.

Highly-preferred embodiments of the improved insertion tool include a link-block latch arm attached to the retractor assembly and configured to hold the link block within the retractor assembly.

Other highly-preferred embodiments include a removable connector configured to be attached to the elongate object-holder and mounted in the travel-plate assembly, and the travel-plate assembly is configured to receive the removable connector from a direction perpendicular to the elongate object-holder. Some of these embodiments include a latch attached to the travel-plate assembly and configured to hold the removable connector within the travel-plate assembly.

In some preferred embodiments of the inventive insertion tool, the top-plate assembly includes a top-plate clearance hole and a top-plate slot configured to enable the elongate object-holder to be placed into and out of the clearance hole at a point along the length of the elongate object-holder.

BRIEF DESCRIPTION OF THE DRAWINGS

FIG. 2 is an exploded perspective view of the insertion tool embodiment of FIG. 1, indicating the various figures in which various subassemblies of the insertion tool embodiment are shown in more detail.

FIG. 3A is an enlarged exploded perspective view of the retractor assembly of the insertion tool embodiment of FIG. 1.

FIG. 3B is an enlarged perspective view of the retractor body and link block of the insertion tool embodiment of FIG. 1.

FIGS. 6A through 6E illustrate a sequence of steps of an exemplary retraction operation using the insertion tool embodiment of FIG. 1 to remove an object from a pressurized vessel to which a monitoring probe has been mounted.

FIG. 6A is a perspective view of a monitoring probe on which the insertion tool of FIG. 1 is used in the sequence of FIGS. 6A through 6E.

FIG. 6B is a perspective view illustrating the placement of a link block onto the monitoring probe.

FIG. 6C is a perspective view illustrating the placement of a rod-adapter receiver on the rod adapter of the monitoring probe. FIG. 6C further illustrates the positioning of the insertion tool to capture the link block.

FIG. 6D is a perspective view illustrating the insertion tool of FIG. 1 with the link block positioned within the retractor assembly of the insertion tool and with the rod-adapter receiver in place in the travel-plate assembly.

FIG. 6E is a perspective view illustrating the probe rod in a retracted position after the insertion tool has retracted it from a pipeline or other vessel.

FIGS. 8A through 8D illustrate a sequence of steps of an exemplary insertion operation using the insertion tool embodiment of FIG. 1 to insert an injection nozzle of a chemical injection atomizer into a pressurized vessel to which the chemical injection atomizer is mounted.

FIG. 8A is a perspective view of a chemical injection atomizer on which the insertion tool of FIG. 1 is used in the sequence of FIGS. 8A through 8D.

FIG. 8B is a perspective view illustrating the placement of a link block onto the chemical injection atomizer.

FIG. 8C is a perspective view illustrating the placement of a quill receiver on the injection quill of the chemical injection atomizer. FIG. 8C further illustrates the attachment of a fluid inlet assembly to the quill adapter and the positioning of the insertion tool to capture the link block and the quill receiver (after placement).

FIG. 8D is a perspective view illustrating the insertion tool of FIG. 1 with the link block positioned within the retractor assembly of the insertion tool and with the rod-adapter receiver in place in the travel-plate assembly, the quill is ready to be inserted.

FIG. 9A is a perspective view of a monitoring probe on which a prior art insertion tool is used for probe retraction in the sequence of FIGS. 9A through 9D.

FIG. 9B is a perspective view illustrating a prior art insertion tool in position for placement onto the monitoring probe.

FIG. 9C is a perspective view illustrating the prior art insertion tool with its swivel joint in place around the probe rod and with the rod adapter inserted and secured in the travel-plate assembly of the insertion tool.

FIG. 9D is a perspective view illustrating the probe rod in a retracted position after the insertion tool has retracted it from a pipeline or other vessel.

DETAILED DESCRIPTION OF PREFERRED EMBODIMENTS

Figures 9A, 9B, 9C, 9D:
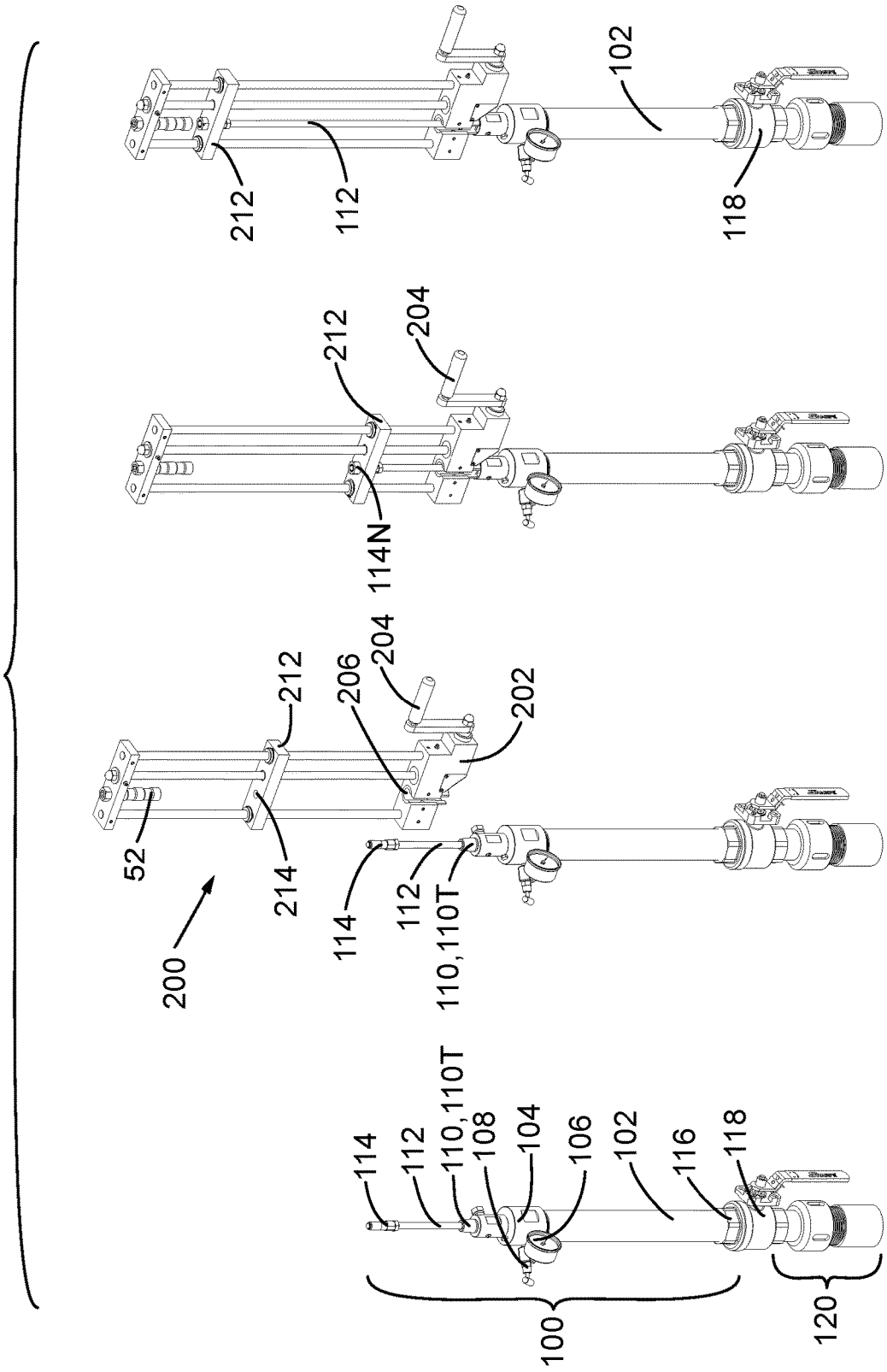
FIGS. 9A through 9D illustrate a sequence of steps of an exemplary removal operation using a prior art insertion tool to remove an object from a pressurized vessel to which a monitoring probe has been mounted. The monitoring probe illustrated in FIGS. 9A through 9D is the same as that illustrated in FIGS. 6A through 6E.
Figure 10:
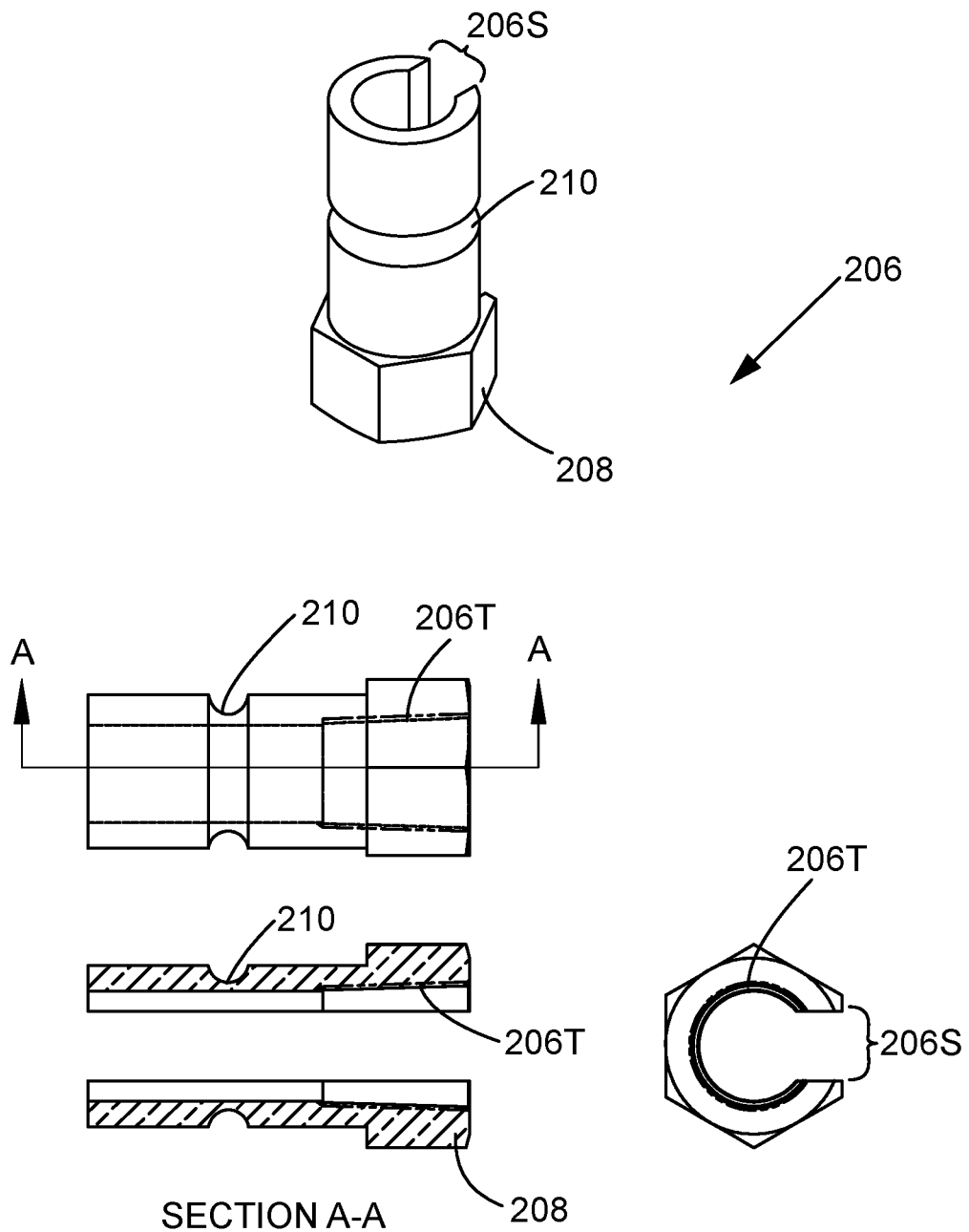
FIG. 10 includes a perspective view and an enlarged three-view drawing of a prior art swivel joint of the prior art insertion tool of FIGS. 9B through 9D.

FIGS. 1 through 8D present various views and levels of detail of one or more embodiments of the inventive insertion tool described herein. Reference numbers of like parts are the same, but not all views include a full complement of reference numbers in order to prevent cluttering the figures. FIGS. 9A through 10 show views of a prior art insertion tool for the purpose of highlighting the significant advantages of the inventive insertion tool presented herein over the prior art.

Figure 1:
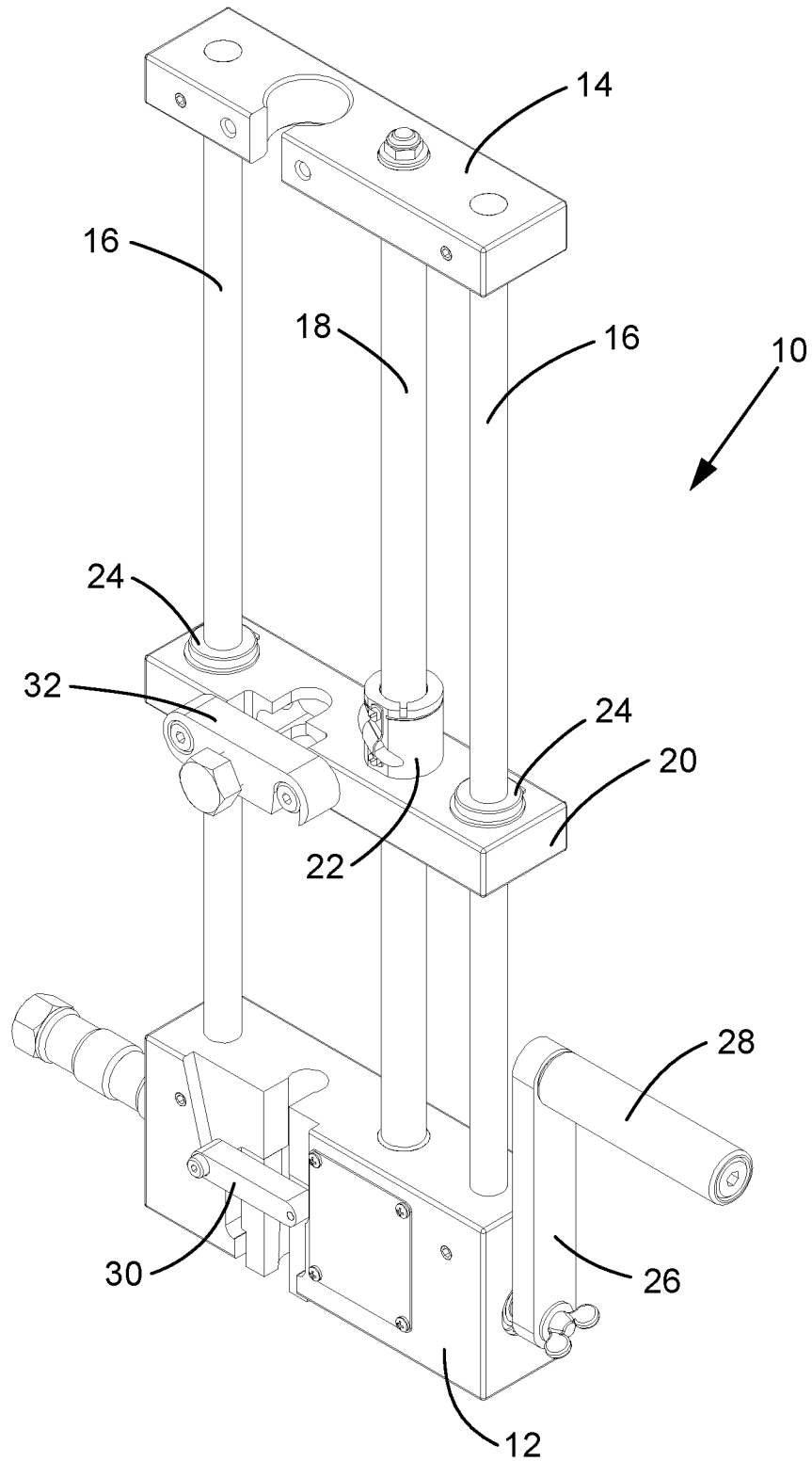
FIG. 1 is a perspective drawing of an embodiment of the inventive insertion tool disclosed herein.

FIG. 1 is a perspective drawing of an embodiment of the inventive insertion tool 10. Insertion tool 10 includes a retractor assembly 12, a top-plate assembly 14, and two elongate guide rods 16. Retractor assembly 12 and top-plate assembly 14 are mounted on opposite ends of guide rods 16. Insertion tool 10 also includes a ball screw 18 on which retractor assembly 12 and top-plate assembly 14 are mounted on opposite ends of ball screw 18. Ball screw 18 includes a ballnut bearing 22 movably mounted thereon and affixed to a travel-plate assembly 20 which is configured to be moved along guide rods 16 to various positions between retractor assembly 12 and top-plate assembly 14. Ballnut bearing 22 is attached to travel-plate assembly 20 as are two linear bearings 24 which slide along guide rods 16 as travel-plate assembly 20 is moved. Proximal ends 16p of guide rods 16 are attached to retractor assembly 12, and distal ends 16d of guide rods 16 are attached to travel-plate assembly 20. (See FIG. 2.)

Insertion tool 10 also includes a crank arm 26 with a crank handle 28 which is used to turn ball screw 18 to drive ballnut bearing 22 and travel-plate assembly 20 along guide rods 16. The mechanism within retractor assembly 12 causing such movement will be described later in this document.

Retractor assembly 12 is configured to hold one portion of a tool such as a monitoring probe 100 (see FIG. 6A), and travel-plate assembly 20 is configured to hold a second portion of a tool such as monitoring probe 100 for the purpose of moving these two portions toward and away from each other to effect insertion and removal of objects mounted within monitoring probe 100. Examples of such operation are shown in FIGS. 6A through 6E and 8A through 8D. Also shown in FIG. 1 are a link-block latch arm 30 and a latch 32 configured to assist in holding the portions of a tool such as monitoring probe 100 in place in retractor assembly 12 and travel-plate assembly 20, respectively.

FIG. 2 is an exploded perspective view of insertion tool 10, indicating the figures in which exploded views of retractor assembly 12, top-plate assembly 14, and travel-plate assembly 20 are shown in more detail.

FIG. 3A is an enlarged exploded perspective view of retractor assembly 12. Note that various fasteners and other common mechanical parts of retractor assembly 12 are not assigned reference numbers since their purpose and function are obvious from the illustration. Retractor assembly 12 includes a retractor body 34, a crank assembly 36, and a space 42 for drive assembly components. Crank assembly 36 includes a drive shaft 44, two drive-shaft bearings 46, a drive miter gear 38, a ball screw miter gear 40, a thrust bearing 48, crank arm 26 and crank handle 28. Crank handle 28 includes a handle shaft bolt 28A, a handle cover 28B, and a handle bearing sleeve 28C. Drive shaft 44 includes a hex end 44E which is configured to permit various hex drive tools (powered or unpowered) to turn crank assembly 36. Drive miter gear 38 is attached to drive shaft 44 which is turned by crank arm 26. Ball screw miter gear 40 is attached to ball screw 18 (not shown in FIG. 3A) and is engaged by drive miter gear 38, thereby causing ball screw 18 to rotate when drive shaft 44 turns. Rotation of ball screw 18 in turn causes movement of ballnut bearing 22 along ball screw 18 to move travel-plate assembly 20 along guide rods 16.

A cover plate 50 is used to close space 42 enclosing the drive components within retractor body 34. A support handle 52 is removably attached to retractor body 34 for ease of handling of insertion tool 10.

FIG. 3B is an enlarged perspective view of retractor body 34 and a link block 54. FIG. 3B also shows a link-block slot 56 into which link block 54 is placed and held during operation of insertion tool 10. As seen in FIG. 3B (and in sequences of FIGS. 6A-6E and 8A-8D), link block 54 is configured to be easily placed into and removed from retractor body 34 and to be constrained to one degree-of-freedom movement during such placement and removal. As will be seen later in this document, such configurations of link block 54 and link-block slot 56 provide significant operational advantages of the insertion tool of this invention over the prior art. Link-block latch arm 30 assists in holding link block 54 in place during operation.

Figure 4:
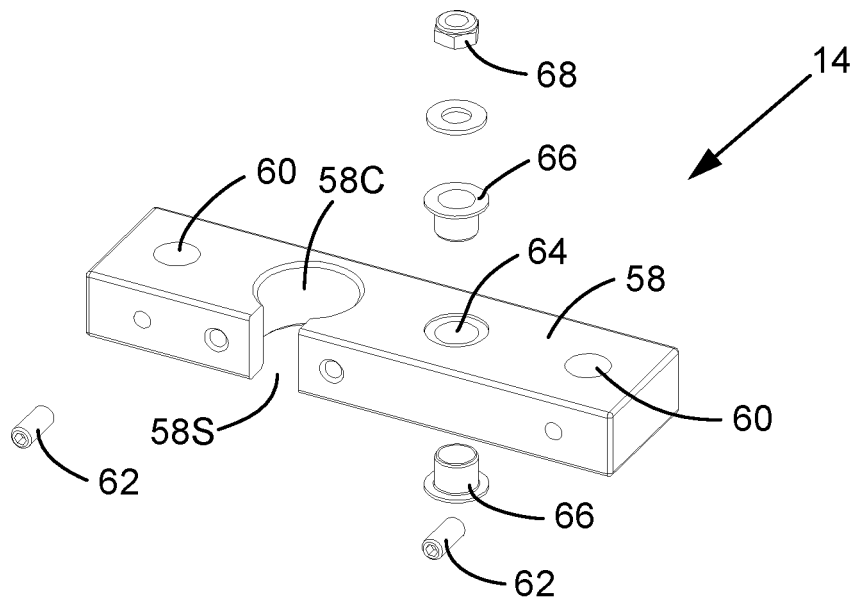
FIG. 4 is an enlarged exploded perspective view of the top-plate assembly of the insertion tool embodiment of FIG. 1.

FIG. 4 is an enlarged exploded perspective view of top-plate assembly 14. Top-plate assembly 14 includes a top plate 58 which has two guide-rod mounting holes 60 and a ball-screw mounting hole 64. Two set screws 62 hold guide rods 16 in place in top plate 58. Top-plate assembly 14 also includes two bushings 66 in which ball screw 18 turns and a clearance hole 58C to provide pass-through clearance during certain operational modes. Top-plate assembly 14 also includes a top-plate slot 58S configured to enable an elongate structure to be placed into and out of the clearance hole at a point along the length of the elongate structure. More specific details of such configurations are shown in FIGS. 6A-6E, 8A-8D, and 9A-9D. Ball screw 18 is secured to top plate 58 using a ball-screw nut 68.

Figure 5:
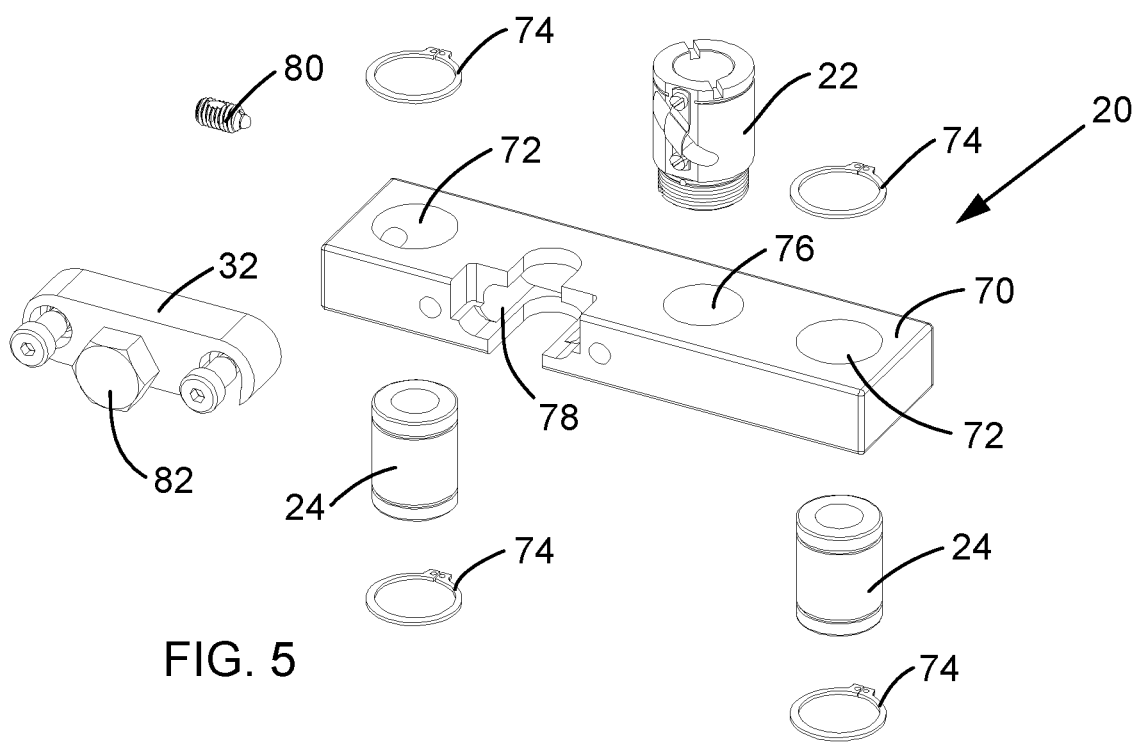
FIG. 5 is an enlarged exploded perspective view of the travel-plate assembly of the insertion tool embodiment of FIG. 1.

FIG. 5 is an enlarged exploded perspective view of travel-plate assembly 20. Travel-plate assembly 20 includes a travel plate 70 which has two guide-rod holes 72 into which two linear bearings 24 are mounted, held in place by four retaining rings 74 as shown. Travel-plate assembly 20 is slidably mounted on guide rods 16 using linear bearings 24. Travel-plate assembly 20 also includes ballnut bearing 22 attached to travel plate 70 in ball-screw hole 76.

Travel plate 70 includes a receiver slot 78 which is configured to receive a rod-adapter receiver 122 (see FIGS. 7B and 6C-6E) or other structures such as a collet assembly 126 (see FIGS. 7D and 8C-8D) depending on the operation for which insertion tool 10 is being used. Rod-adapter receiver 122 and collet assembly 126 will be described later in this document.

Rod-adapter receiver 122 and collet assembly 126 are also referred to herein more generally as removable connectors 122 and 126, respectively. Receiver slot 78 is configured such that removable connectors 122 and 126 are received therein from a direction perpendicular to elongate object-holders 112 and 132, respectively, simplifying the procedure of attachment of elongate object-holders 112 and 132 to travel-plate assembly 20. Latch 32 assists in holding such removable connectors 122 and 126 in place during operation and includes collet lock bolt 82. As will be seen, such configurations of receiver slot 78 and removable connectors 122 and 126 provide significant operational advantages of the insertion tool of this invention over the prior art.

Travel-plate assembly 20 also includes a ball-nose spring plunger 80 which is inserted into travel plate 70 in position to secure rod-adapter receiver 122 or collet assembly 126 within receiver slot 78. The placement of spring plunger 80 is not visible with FIG. 5, but its placement and use are well-known to those skilled in mechanical design.

FIGS. 6A through 6E illustrate a sequence of steps of an exemplary retraction operation using insertion tool 10 to remove an object (not shown) from a pressurized vessel (not shown) to which monitoring probe 100 has been mounted using a pressure-vessel fitting assembly 120 and a ball valve 118. In each of these five figures, ball valve 118 is shown in an open position which permits a probe rod 112 to be in position within ball valve 118 to place the object in the pressurized vessel. Probe rod 112 is in such an inserted position in each of FIGS. 6A-6E, and the pressure within monitoring probe 100 is at the pressurized-vessel pressure. In FIG. 6E, probe rod 112 and the object attached thereto have been withdrawn from the pressurized vessel, and ball valve 118 is ready to be closed to isolate monitoring probe 100 from the pressure of the pressurized vessel in order to provide access to the object on probe rod 112.

Monitoring probe 100 is also referred to herein more generally as a connection tool 100. In the example of FIGS. 6A-6E, connection tool 100 includes probe rod 112, also referred to herein as an elongate object-holder 112, and a monitoring-probe body 102, also referred to as body 102 of connection tool 100. The object (not shown) to be inserted or removed is attached to a vessel-end (not shown) of elongate object-holder 112.

FIG. 6A is a perspective view of monitoring probe 100. Monitoring probe 100 includes monitoring-probe body 102 secured to ball valve 118 through a pipe connection 116. Monitoring probe 100 also includes a probe cap assembly 104, a pressure gauge 106, a pressure relief valve 108, and a holder cap 110 with cap threads 110T for attaching link block 54. A rod adapter 114 is mounted on probe rod 112 as shown. FIG. 6A also illustrates link block 54 as ready to be installed onto holder cap 110.

FIG. 6B illustrates link block 54 in its installed position on connector 110. FIG. 6C illustrates rod-adapter receiver 122 installed onto rod adapter 114 on the end of probe rod 112, secured with a rod-adapter nut 114N. FIG. 6C also illustrates insertion tool 10 ready to receive link block 54 into retractor assembly 12 and rod-adapter receiver 122 to be placed into travel-plate assembly 20.

FIG. 6D illustrates insertion tool 10 with link block 54 positioned within retractor assembly 12 and rod-adapter receiver 122 in place in travel-plate assembly 20. In order for these positions to be reached, it may be necessary to turn crank handle 28 to establish the correct spacing between link block 54 and rod-adapter receiver 122. FIG. 6D also shows link-block latch arm 30 and latch 32 in positions to assist in holding link block 54 and rod-adapter receiver 122 in place, respectively.

FIG. 6E illustrates probe rod 112 in a retracted position after insertion tool 10 has retracted it from the pressurized vessel. The apparatus is now ready for ball valve 118 to be closed, isolating monitoring probe 100 from the pressurized vessel. Pressure relief valve 108 can then be actuated to drop the pressure in monitoring probe 100 so that safe access is available to the object on probe rod 112.

Figure 7C:
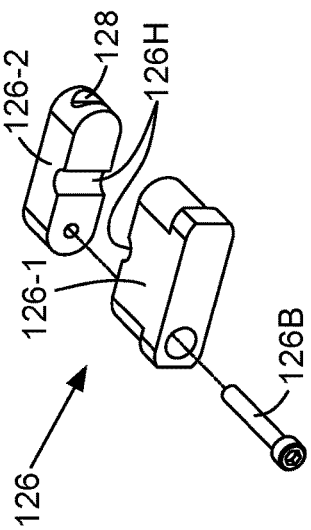
FIG. 7C is an exploded perspective view of a collet assembly of the insertion tool of FIG. 1.
Figure 7A:
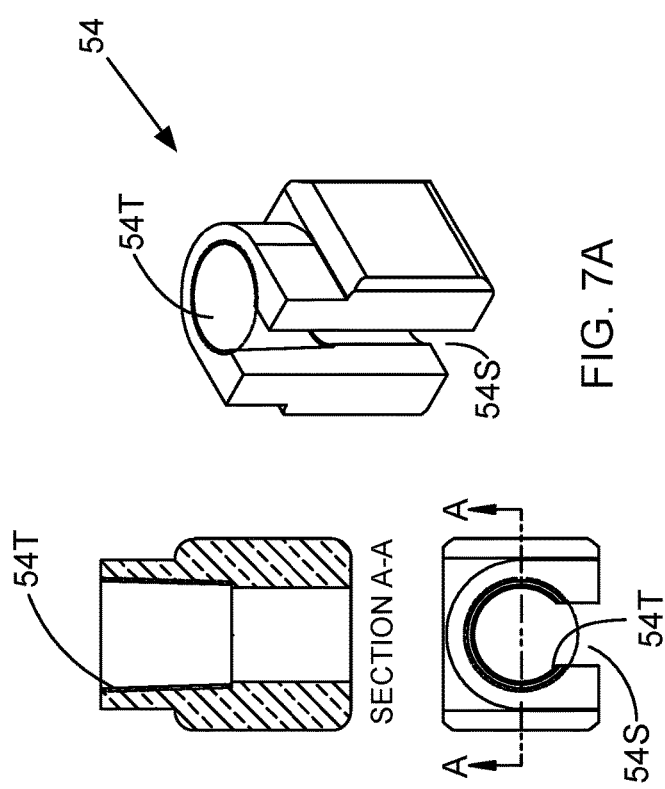
FIG. 7A includes an enlarged top view, a cross-sectional view and a perspective view of a link block of the insertion tool of FIG. 1.

FIG. 7A includes an enlarged top view, a cross-sectional view and a perspective view of link block 54. Link block 54 includes link-block threads 54T which enable link block 54 to be attached to holder cap 110 by mating with cap threads 110T. (Note that in FIG. 7A, link block 54 is oriented upside down from other illustrations of link block 54 herein.) Link block 54 permits swiveling movement between link block 54 and monitoring probe 100 by virtue of cap threads 110T while completely constraining swiveling movement (no degrees-of-freedom of movement) of link block 54 within retractor assembly 12. Link block 54 also includes slot 54S which enables link block 54 to easily receive elongate object-holder 112 as insertion tool 10 is being attached to monitoring probe 100 after link block 54 has been mounted onto holder cap 110.

Attachment of link block 54 to probe cap assembly 104 via holder cap 110 prior to being removably mounted in retractor assembly 12 provides a significant performance advantage over the prior art. (See FIGS. 9A-10 for more detail on the configuration and operation of a prior art insertion tool.) This feature enables a single operator to very simply attach link block 54 to holder cap 110 without having to hold the remainder of insertion tool 10 during such a procedure. By comparison and referring to FIGS. 9A-10, the prior art requires a prior art insertion tool 200 to be held in place relative to monitoring probe 100 and at the same time requires that a swivel joint 206, which is permanently and rotatably mounted within retractor assembly 202, be rotated within retractor assembly 202 in order to attach insertion tool 200 to monitoring probe 100. Such procedures are often in awkward locations and positions and in difficult environmental conditions, and very often require more than one operator.

Figure 7B:
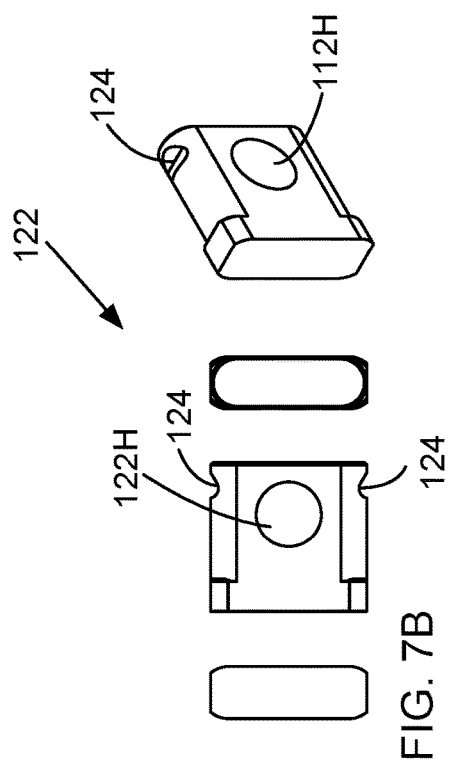
FIG. 7B includes an enlarged top view, two end views and a perspective view of a rod-adapter receiver of the insertion tool of FIG. 1.

FIG. 7B includes an enlarged top view, two end views and a perspective view of rod-adapter receiver 122 of insertion tool 10. Rod-adapter receiver 122 includes two receiver detents 124 as shown, one of which is engaged by ball-nose spring plunger 80 in travel plate 70. Rod-adapter receiver 122 also includes an adapter hole 122H for mounting rod-adapter receiver 122 onto rod adapter 114 on the end of probe rod 112.

FIG. 7C is an exploded perspective view of a collet assembly 126 to be used in certain applications of insertion tool 10, as illustrated in the sequence of FIGS. 8A through 8D. Collet assembly 126 includes two collet detents 128 as shown, one of which is engaged by ball-nose spring plunger 80 in travel plate 70. Collet assembly 126 also includes a first collet portion 126-1 and a second portion 126-2. When the collet portions 126-1 and 126-2 are aligned, they form a collet hole 126H in which a rod or quill (see FIGS. 8A-8D) is gripped. Collet assembly 126 also includes a collet bolt 126B for assembly of collet 126. Collet assembly 126 is then received by receiver slot 78 of travel plate 70 and tightened for gripping by collet lock bolt 82 (see FIG. 5) of latch 32.

Figure 7D:
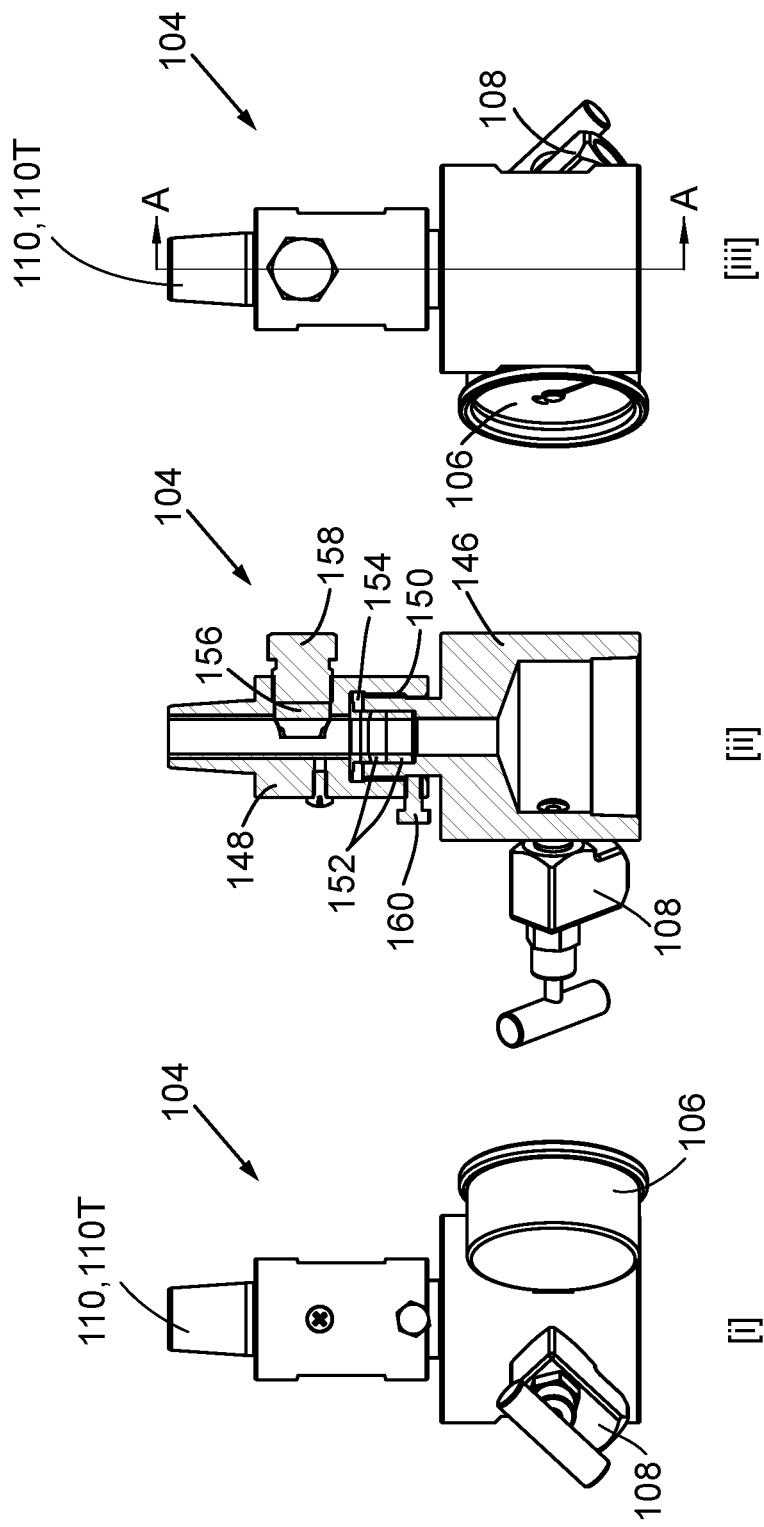
FIG. 7D shows three views of a probe cap assembly of a monitoring probe for which the insertion tool of FIG. 1 is used for probe insertion and retraction.

FIG. 7D shows three partial perspective views (two side views [i] and [iii] and a cross-sectional view [ii]) of probe cap assembly 104 of monitoring probe 100 showing pressure gauge 106, relief valve 108, and holder cap 110 with cap threads 110T. Probe cap assembly 104 also includes a lower body portion 146, and upper body portion 148, fluid-assembly threads 150, a pair of Grafoil® flexible graphite seal rings 152 which may be obtained from American Seal and Packing of Santa Ana, Calif., a compression ring 154, a lock collar, a lock-collar bolt 158, and an assembly lock bolt 160. Grafoil® is a registered trademark of NeoGraf Solutions, LLC of Lakewood, Ohio. A graphite-filled Teflon seal may also be used.

Referring primarily to view [ii] of FIG. 7D, the sealing around probe rod 112 (or injection quill 132—see FIGS. 8A-8D) is created by tightening upper body portion 148 on lower body portion 146 using fluid-assembly threads 150. Such tightening compresses Grafoil® seal rings 152 through compression ring 154 and around rod 112 or quill 132 within lower body portion 146. Rod 112 or quill 132 are able to slide through seal rings 152 while maintaining a pressure seal. Assembly lock bolt 160 is used to hold upper body portion 148 relative to lower body portion 146 when desired. Lock collar 156 partially surrounds rod 112 or quill 132 and is locked in place using lock-collar bolt 158.

FIGS. 8A through 8D illustrate a partial sequence of steps of an exemplary insertion operation using insertion tool 10 to insert an injection nozzle (not shown) of a chemical injection atomizer 130 into a pressurized vessel (not shown) to which chemical injection atomizer 130 has been mounted using a pressure-vessel fitting assembly 120 and a ball valve 118. Similar to the previous process sequence example, in each of these four figures, ball valve 118 is shown in a closed position with atomizer 130 at atmospheric pressure, permitting an injection quill 132 which holds the injection nozzle to be in position within atomizer 130 prior to insertion of the injection nozzle in the pressurized vessel. (Note that for drawing convenience only, the handle of ball valve 118 is shown indicating an open position.) Injection quill 132 is in such a ready position in each of FIGS. 8A-8D, and the pressure within chemical injection atomizer 130 is at atmospheric pressure. (Pressure within atomizer 130 may also be at an elevated level depending on events or operations prior to this example sequence.) In FIG. 8D, injection quill 132 and the injection nozzle attached thereto are ready to be inserted into the pressurized vessel—ball valve 118 is ready to be opened to permit movement of injection quill 132 into the pressurized vessel.

Chemical injection atomizer 130 is also referred to herein more generally as connection tool 100. In the example of FIGS. 8A-8D, connection tool 100 includes injection quill 132, also referred to herein as elongate object-holder 112, and an atomizer body 131, also referred to as body 131 of connection tool 130. The injection nozzle (not shown) to be inserted or removed is attached to the vessel-end (not shown) of elongate object-holder 112.

FIG. 8A is a perspective view of chemical injection atomizer 130. (Some like components of monitoring probe 100 and chemical injection atomizer 130 are numbered using the same reference numbers.) Chemical injection atomizer 130 includes atomizer body 131 secured to ball valve 118 through a pipe connection 116. Chemical injection atomizer 130 also includes probe cap assembly 104, pressure gauge 106, and holder cap 110 with cap threads 110T for attaching link block 54. A quill adapter 134 is mounted on injection quill 132 as shown. FIG. 8A also illustrates link block 54 placed around injection quill 132 and ready to be installed onto holder cap 110.

FIG. 8B illustrates link block 54 in its installed position on connector 110. FIG. 8C illustrates collet assembly 126 partially installed onto injection quill 132 and a fluid inlet assembly 136 attached to quill adapter 134 on the end of injection quill 132. FIG. 8C also illustrates insertion tool 10 ready to receive link block 54 into retractor assembly 12 and collet assembly 126 to be placed into travel-plate assembly 20.

Fluid inlet assembly 136 includes an isolation valve 138, pressure gauge 106, a check valve 140, and a fluid filter 142 having a fluid source connector 144 attached thereto. The fluid source (not shown) contains fluid to be atomized into the pressurized vessel, and such a source system may include a pressure relief valve (not shown). Operation of such fluid injection is well-known by those of the chemical process industry and need not be further described here.

FIG. 8D illustrates insertion tool 10 with link block 54 positioned within retractor assembly 12 and collet assembly 126 in place in travel-plate assembly 20. In order for these positions to be reached, it may be necessary to turn crank handle 28 or adjust the position of collet assembly 126 on injection quill 132 to establish the correct spacing between link block 54 and injection quill 132. FIG. 8D also shows link-block latch arm 30 and latch 32 in positions to assist in holding link block 54 and collet assembly 126 in place, respectively.

FIG. 8D shows injection quill 132 in a retracted position prior to insertion tool 10 being used to insert quill 132 into the pressurized vessel. The apparatus is now ready for ball valve 118 to be opened, placing chemical injection atomizer 130 in fluid communication with the pressurized vessel.

As previously described (see FIG. 4), top-plate assembly 14 includes a top-plate clearance hole 58C and a top-plate slot 58S configured to enable elongate object-holder 132 to be placed into and out of clearance hole 58C at a point along the length of elongate object-holder 132 when required during operation.

FIGS. 9A through 9D illustrate a sequence of steps of an exemplary retraction operation using a prior art insertion tool 200 to remove an object (not shown) from a pressurized vessel (not shown) to which monitoring probe 100 has been mounted using pressure-vessel fitting assembly 120 and ball valve 118. In each of these four figures, ball valve 118 is shown in an open position which permits probe rod 112 to be in position within ball valve 118 to place the object in the pressurized vessel. Probe rod 112 is in such an inserted position in each of FIGS. 9A-9C, and the pressure within monitoring probe 100 is at the pressurized-vessel pressure. In FIG. 9D, probe rod 112 and the object attached thereto have been withdrawn from the pressurized vessel, and ball valve 118 is ready to be closed to isolate monitoring probe 100 from the pressure of the pressurized vessel in order to provide access to the object on probe rod 112.

FIG. 9A is a perspective view of monitoring probe 100, identical to monitoring probe 100 as shown in FIG. 6A. FIG. 9B illustrates prior art insertion tool 200 in position to engage monitoring probe 100. Prior art insertion tool 200 includes a prior art retractor assembly 202, a prior art crank handle 204, a prior art swivel joint 206, and a prior art travel-plate assembly 212 having a prior art travel-plate rod hole 214. Prior art swivel joint 206 is rotatably mounted within prior art retractor assembly 202. (See FIG. 10 for more detail on prior art swivel joint 206.) Prior art insertion tool 200 also includes support handle 52 shown in a stored position.

FIG. 9C illustrates prior art swivel joint 206 threaded onto holder cap 110 using cap threads 110T. Since prior art swivel joint 206 is mounted within prior art retractor assembly 202, the attachment of prior art swivel joint 206 to holder cap 110 is an awkward and difficult procedure, often being carried out in harsh environmental conditions—prior art swivel joint 206 must be rotated within prior art retractor assembly 202 while supporting the weight of prior art insertion tool 200.

FIG. 9C also illustrates prior art travel-plate assembly 212 lowered into position such that rod adapter 114 is inserted into prior art travel-plate rod hole 214. Rod-adapter nut 114N is used to secure rod adapter 114 within prior art travel-plate assembly 212. FIG. 9D illustrates probe rod 112 in a retracted position after prior art insertion tool 200 has retracted it from the pressurized vessel. The apparatus is now ready for ball valve 118 to be closed, isolating monitoring probe 100 from the pressurized vessel.

FIG. 10 includes a perspective view and an enlarged three-view drawing of prior art swivel joint 206 of prior art insertion tool 200 of FIGS. 9B through 9D as described in such sequence of figures. Prior art swivel joint 206 includes a slot 206S, a swivel-joint groove 210 used to hold swivel joint 206 in insertion tool 200 while permitting rotation, a swivel-joint lower end 208 used to hand- or tool-rotate swivel joint 206, and swivel-joint threads 206T used to engage cap threads 110T of holder cap 110.

While the principles of this invention have been described in connection with specific embodiments, it should be understood clearly that these descriptions are made only by way of example and are not intended to limit the scope of the invention.

The invention claimed is:

1. In an insertion tool for placing and removing an object in and out of a pressurized vessel, the object mounted on a vessel-end of an elongate object-holder of a connection tool that is attached to the pressurized vessel and in which the elongate object-holder is slidably and sealably mounted, the insertion tool including (a) one or more elongate guides each having a distal end and a proximal end, (b) a retractor assembly attached to the proximal end of the elongate guides, (c) a top-plate assembly attached to the distal end of the elongate guides, and (d) a travel-plate assembly slidably mounted to the elongate guides and configured to be attached to the elongate object-holder and moved along the elongate guides by the retractor assembly, the improvement comprising: the retractor assembly includes a removable link block configured to be removably attached to a body of the connection tool, the link block configured to thereafter be removably mounted in the retractor assembly with no degrees-of-freedom of movement while mounted in the retractor assembly.

2. The improved insertion tool of claim 1 further including a link-block latch arm attached to the retractor assembly and configured to hold the link block within the retractor assembly.

3. The improved insertion tool of claim 1 further including a removable connector configured to be attached to the elongate object-holder and mounted in the travel-plate assembly, the travel-plate assembly being configured to receive the removable connector from a direction perpendicular to the elongate object-holder.

4. The improved insertion tool of claim 3 further including a latch attached to the travel-plate assembly and configured to hold the removable connector within the travel-plate assembly.

5. The improved insertion tool of claim 1 wherein the top-plate assembly includes a top-plate clearance hole and a top-plate slot configured to enable the elongate object-holder to be placed into and out of the clearance hole at a point along the length of the elongate object-holder.

* * * * *